(12) United States Patent
Henry et al.

(10) Patent No.: US 9,191,335 B2
(45) Date of Patent: Nov. 17, 2015

(54) LINK RATE AVAILABILITY BASED ARBITRATION

(71) Applicant: LSI Corporation, Milpitas, CA (US)

(72) Inventors: Charles D. Henry, Wichita, KS (US); Reid A. Kaufmann, Andover, KS (US); Jeffrey D. Weide, Augusta, KS (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 97 days.

(21) Appl. No.: 13/713,047

(22) Filed: Dec. 13, 2012

(65) Prior Publication Data

US 2014/0169210 A1    Jun. 19, 2014

(51) Int. Cl.
    *H04L 12/26*    (2006.01)
    *H04L 1/00*     (2006.01)
    *H04L 12/875*   (2013.01)
    *G06F 13/40*    (2006.01)

(52) U.S. Cl.
    CPC ............ *H04L 47/56* (2013.01); *G06F 13/4022* (2013.01)

(58) Field of Classification Search
    CPC .................................................. H04L 47/741
    See application file for complete search history.

(56) References Cited

U.S. PATENT DOCUMENTS

| 8,095,722 B1 | 1/2012 | Liao et al. | |
| 2009/0201818 A1* | 8/2009 | Patwardhan et al. | 370/241 |
| 2012/0124405 A1* | 5/2012 | Diab et al. | 713/324 |
| 2012/0215937 A1* | 8/2012 | Myrah et al. | 709/235 |
| 2012/0233399 A1* | 9/2012 | Kurokawa et al. | 711/114 |

* cited by examiner

*Primary Examiner* — Steven H Nguyen
*Assistant Examiner* — Rebecca Song

(57) ABSTRACT

The disclosure is directed to a system and method for managing connections across a plurality of phys including at least one phy having a first link rate and at least one phy having a second link rate. At least one connection request including a selected link rate is received from an initiator. An arbitration in progress (AIP) delay is provided when at least one phy having the selected link rate or higher is not available. During the AIP delay, a link manager continues to check for a phy having the selected link rate or higher. The link manager completes the connection request if a phy having the selected link rate or higher becomes available before the AIP delay ends.

20 Claims, 2 Drawing Sheets

LINK RATE AVAILABILITY BASED ARBITRATION

BACKGROUND

Data storage systems and data management networks can include expanders with a plurality of phys having different link rates. An initiator may request a connection at a selected link rate from an expander. However, a phy satisfying the selected link rate may or may not be available.

SUMMARY

An embodiment of the disclosure is an expander including a plurality of phys. The plurality of phys include at least one phy having a first link rate and at least one phy having a second link rate. A link manager in communication with the plurality of phys is configured to receive at least one connection request including a selected link rate from an initiator. The link manager is further configured to initiate an arbitration in progress (AIP) delay when all phys having the selected link rate or higher are not available. The link manager is further configured to determine whether a phy having the selected link rate or higher becomes available before the AIP delay ends. If a phy having the selected link rate or higher becomes available before the AIP delay ends, the link manager is configured to complete the connection request. Otherwise, the link manager is configured to return a rejection message to the initiator indicating the lack of an available phy with the selected link rate or higher.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
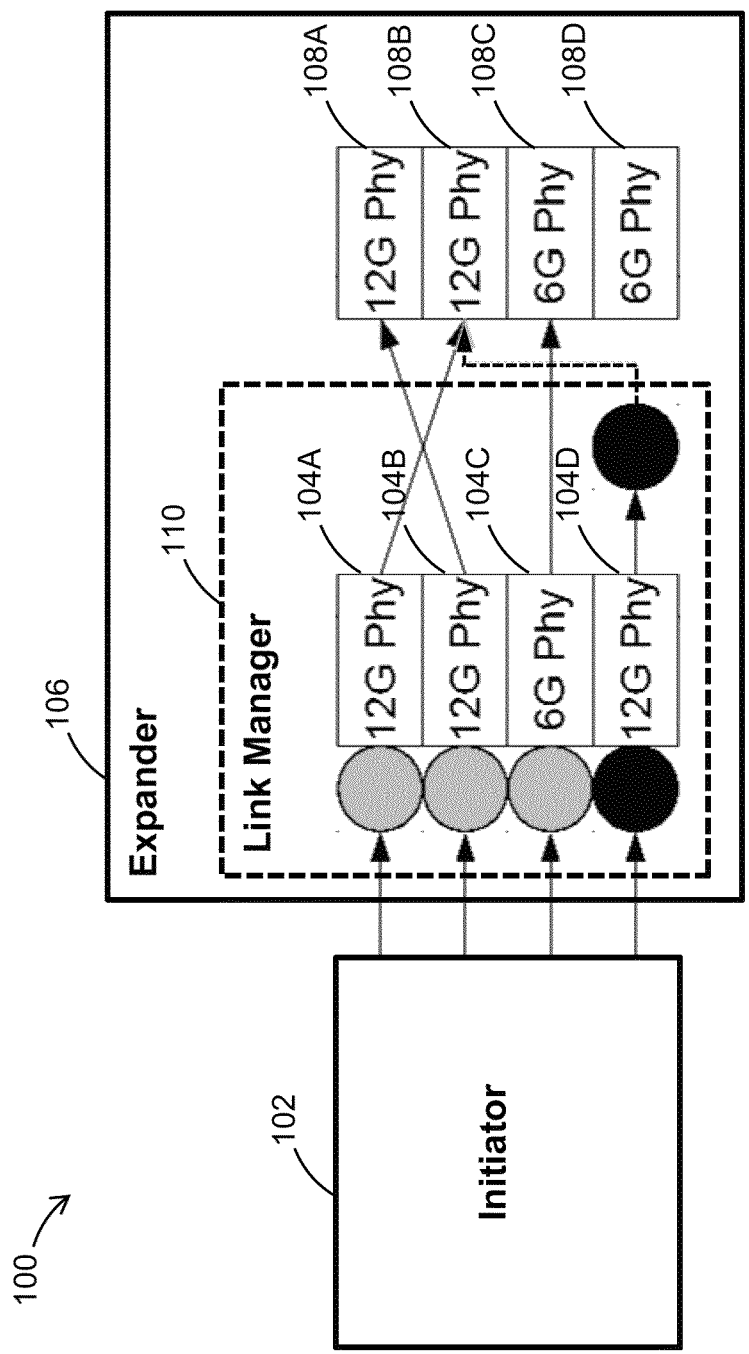
FIG. 1 is a block diagram illustrating a system for managing connections, in accordance with an embodiment of the disclosure.
Figure 2:
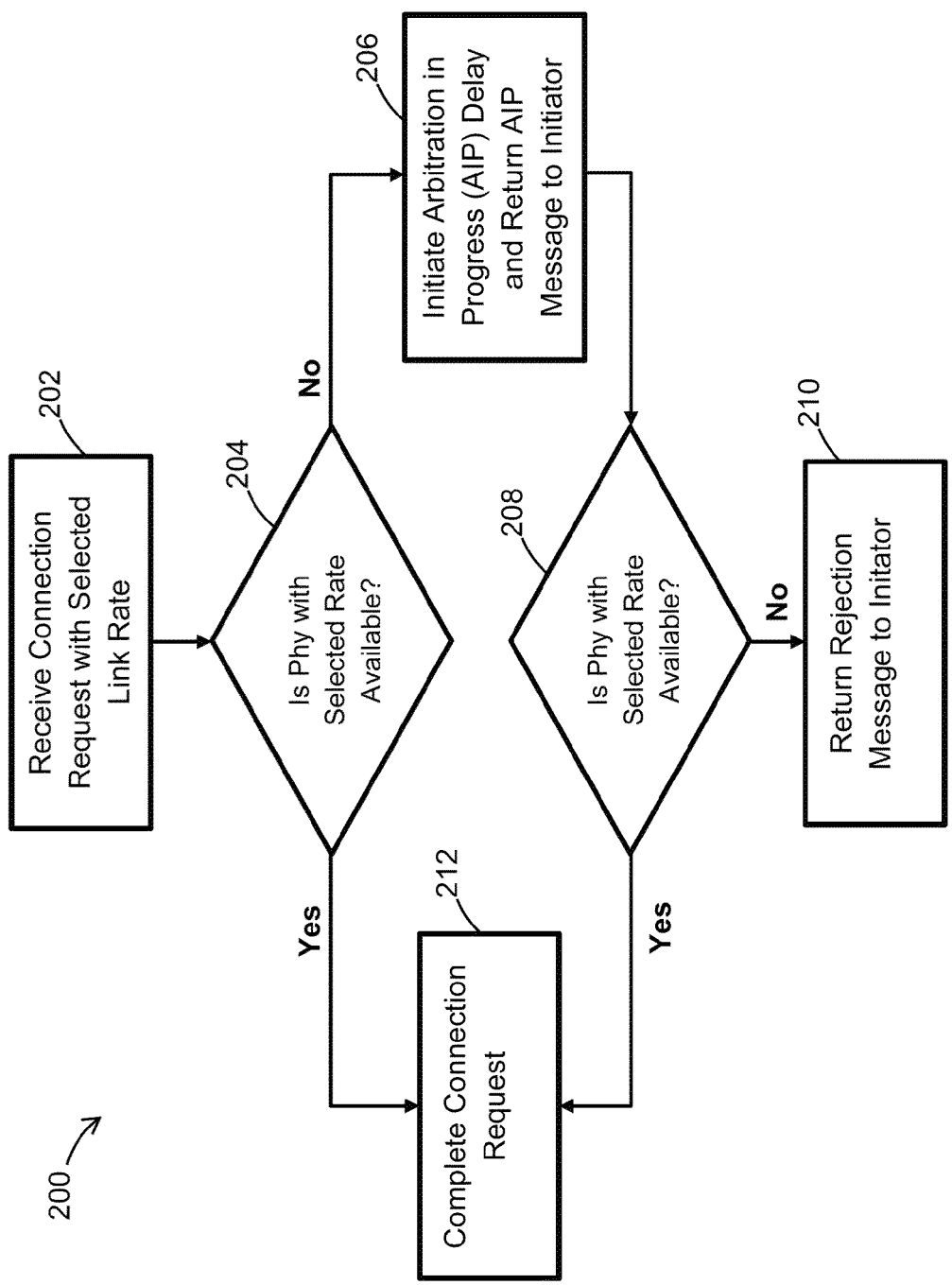
FIG. 2 is a flow diagram illustrating a method of managing connections, in accordance with an embodiment of the disclosure.

FIGS. 1 and 2 illustrate embodiments of a system and method for managing connections for data storage systems or networks including, but not limited to, direct-attached storage (DAS), network-attached storage (NAS), storage area network (SAN), and redundant array of independent disks (RAID) systems or networks. FIG. 1 illustrates an embodiment of a system 100 including at least one expander 106 such as, but not limited to, a serial attached SCSI (SAS) expander. The system 100 further includes at least one link manager 110 in communication with the expander 106. In some embodiments, the expander 106 includes the link manager 110 integrated within hardware, software, or firmware of the expander 106. In other embodiments, the link manager 110 includes hardware, software, or firmware distinct from the expander 106. The expander 106 or link manager 110 can include any combination of hardware, software, or firmware such as, but not limited to, an electronic circuit or at least one processor configured to execute program instructions from carrier media.

The expander 106 further includes a plurality of phys 108 configured for establishing connections at a plurality of negotiated link rates. In an embodiment, the plurality of phys 108 includes at least one phy 108A, 108B having a first link rate, at least one phy 108C, 108D having a second link rate, and so on. It is contemplated that an expander 106 can include any number of phys having any combination of link rates. Accordingly, the embodiments described herein should not be interpreted as limiting the disclosure in any way.

At least one initiator 102 is configured to send at least one connection request 104 including a selected link rate to the expander 106. In an embodiment, the connection request 104 includes an open address frame (OAF) with a selected link rate included in the OAF. The link manager 110 is configured to pair the connection request 104 with an available phy 108 having the selected link rate or a link rate higher than the selected link rate. In an embodiment, the selected link rate is equal to a requested link rate. In another embodiment, the selected link rate includes any rate not less than a requested link rate.

In some embodiments, the link manager 110 is further configured to pair the connection request 104 with an available phy 108 having a link rate not less than the selected link rate and not greater than another available phy 108 that is capable of fulfilling the selected link rate. This prevents phys 108 with higher link rates from being unnecessarily occupied with connection requests 104 that could be fulfilled by phys 108 with lower link rates.

Upon receiving the connection request 104 directly or indirectly from the initiator 102, the link manager 110 determines whether a phy 108 is available with the selected link rate or higher. When there are no phys 108 with the selected link rate or higher available, the link manager 110 is configured to hold the connection request 104D having the selected link rate for a fixed or dynamic time interval (hereinafter "arbitration in progress (AIP) delay") to allow at least one phy 108A, 108B with the selected link rate or higher to become available. In an embodiment, the link manager 110 is further configured to send an AIP message (e.g. "Arbitration in Progress" or "Waiting on Connection") to the initiator indicating that the connection request 104D is being held for the AIP delay period to allow a phy 108A, 108B with the selected link rate or higher to become available.

During the AIP delay period, the link manager 110 continues to scan for an available phy 108 with the selected link rate or higher. The link manager 110 is configured to establish the requested connection 104D if a phy 108A, 108B with the selected link rate or higher becomes available during the AIP delay period. In an embodiment, the link manager 110 is configured to deny the connection request and return a rejection message (e.g. "Open Reject—Connection Rate Not Supported") if all phys 108A, 108B having the selected link rate or higher are still unavailable when the AIP delay ends. In another embodiment, the link manager 110 is configured to establish a connection with an available phy 108D having a link rate lower than the selected link rate if all phys 108A, 108B having the selected link rate or higher are still unavailable when the AIP delay ends. By holding the connection request 104 for the AIP delay period, the link manager 110 allows phys 108 within the expander 106 having the selected link rate or higher a time interval to become available.

Accordingly, the link manager 110 decreases the frequency of connection retries due to denied connection requests 104 and lower rate connections.

As previously discussed, the AIP delay can be a fixed or dynamic time interval. In an embodiment, the AIP delay is a fixed time interval that is selected or predetermined. In another embodiment, the AIP delay is a dynamic time interval that is discretely or continuously variable. In some embodiments, the dynamic time interval is based on heuristics or connection activity such as, but not limited to, past or pending connection requests. The information utilized to determine a time interval for the AIP delay can include number of requests, link rates requested, and the like. The dynamic time interval is lengthened, shortened, or eliminated in response to heuristics or connection activity. In one embodiment, the link manager 110 is configured to eliminate the AIP delay and provide a rejection message or lower link rate connection immediately when phys 108A, 108B with faster link rates are consistently oversubscribed.

FIG. 2 is a flow diagram illustrating an embodiment of a method 200 for managing connections. System 100 is a manifestation of method 200 and all steps or features described with regard to embodiments of system 100 or method 200 are applicable to both the system 100 and method 200. However, it is noted herein that one or more steps of method 200 may be executed via other means known to the art. Embodiments of system 100 described herein should not be interpreted to limit method 200 in any way.

At step 202, at least one connection request 104 including a selected link rate is received from an initiator 102. At step 204, a plurality of phys 108 are scanned to determine whether a phy 108 having the selected link rate or higher is available. If a phy 108 with the selected link rate or higher is available, the method 200 proceeds directly to step 212 and establishes a connection with an available phy 108 having the selected link rate or higher. In an embodiment, a message indicating successful completion of the connection request 104 is returned to the initiator 102 at step 212. If a phy 108 with the selected link rate or higher is not available (i.e., all phys at the selected link rate or at higher link rates are unavailable, such as by being utilized by other requests), the method 200 proceeds to step 206 and initiates an AIP delay. In an embodiment, a message indicating the connection request 104 is being held for the AIP delay period is returned to the initiator 102 at step 206.

At step 208, the phys 108 are scanned continuously or periodically during the AIP delay to determine whether or not a phy 108 having the selected link rate or higher becomes available. If a phy 108 with the selected link rate or higher becomes available before the AIP delay expires, the method 200 proceeds to step 212 and establishes the requested connection. If a phy 108 with the selected link rate or higher does not become available before the AIP delay expires, the method 200 proceeds to step 210 and denies the connection request 104. In an embodiment, a rejection message is returned to the initiator at step 210 to indicate lack of a phy 108 with the selected link rate or higher that is not already in use. In another embodiment, a connection is established at step 210 with a phy 108 having a lower link rate than the selected link rate.

It should be recognized that in some embodiments the various steps described throughout the present disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that any embodiment of the disclosure manifested above as a system or method may include at least a portion of any other embodiment described herein. Those having skill in the art will appreciate that there are various embodiments by which systems and methods described herein can be effected, and that the implementation will vary with the context in which an embodiment of the disclosure deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for managing connections, comprising:
an expander including one or more first physical interfaces (phys) having a first link rate and one or more second phys having a second link rate, wherein the first link rate is different from the second link rate;
an initiator in communication with the expander, the initiator configured to send at least one connection request to the expander, wherein the at least one connection request includes an open address frame including a selected link rate; and
a link manager in communication with the initiator and the expander, the link manager configured to:
determine an arbitration in progress delay to be a dynamic time interval based at least in part on a number of requests and a requested link rate;
initiate the arbitration in progress delay when all phys having the selected link rate or higher are not available;
return a message to the initiator indicating that a particular connection request of the at least one connection request is being held for the arbitration in progress delay period;
determine whether at least one phy having the selected link rate or higher is available before the arbitration in progress delay ends;
pair the particular connection request of the at least one connection request with a particular phy of the at least one phy, the particular phy having a link rate not less than the selected link rate and not greater than a link rate of another available phy;

complete the particular connection request of the at least one connection request when the at least one phy having the selected link rate or higher is available before the arbitration in progress delay ends; and return a message to the initiator indicating that the particular connection request of the at least one connection request was successfully completed.

2. The system of claim 1, wherein the link manager is further configured to send an arbitration in progress message to the initiator when all phys having the selected link rate or higher are not available.

3. The system of claim 1, wherein the link manager is further configured to send a rejection message to the initiator when all phys having the selected link rate or higher are not available after the arbitration in progress delay ends.

4. The system of claim 1, wherein the arbitration in progress delay is fixed.

5. The system of claim 1, wherein the arbitration in progress delay is based on connection activity.

6. The system of claim 5, wherein the arbitration in progress delay is based at least on past connection requests and pending connection requests.

7. The system of claim 1, wherein the link manager is further configured to:

lengthen or shorten the arbitration in progress delay based on heuristics or connection activity.

8. An expander, comprising:

a plurality of physical interfaces (phys) including one or more first phys having a first link rate and one or more second phys having a second link rate, wherein the first link rate is different from the second link rate; and a link manager in communication with the plurality of phys, the link manager configured to:

receive at least one connection request including a selected link rate from an initiator;

determine an arbitration in progress delay to be a dynamic time interval based at least in part on a number of requests and a requested link rate;

initiate the arbitration in progress delay when all phys having the selected link rate or higher are not available;

return a message to the initiator indicating that a particular connection request of the at least one connection request is being held for the arbitration in progress delay period;

determine whether at least one phy having the selected link rate or higher is available before the arbitration in progress delay ends;

pair the particular connection request of the at least one connection request with a particular phy of the at least one phy, the particular phy having a link rate not less than the selected link rate and not greater than a link rate of another available phy;

complete the particular connection request of the at least one connection request when the at least one phy having the selected link rate or higher is available before the arbitration in progress delay ends; and return a message to the initiator indicating that the particular connection request of the at least one connection request was successfully completed.

9. The expander of claim 8, wherein the link manager is further configured to send an arbitration in progress message to the initiator when all phys having the selected link rate or higher are not available.

10. The expander of claim 8, wherein the link manager is further configured to send a rejection message to the initiator when all phys having the selected link rate or higher are not available after the arbitration in progress delay ends.

11. The expander of claim 8, wherein the arbitration in progress delay is based on connection activity.

12. The expander of claim 11, wherein the arbitration in progress delay is based on past connection requests.

13. The expander of claim 11, wherein the arbitration in progress delay is based on pending connection requests.

14. The expander of claim 11, wherein the arbitration in progress delay is based on past connection requests and pending connection requests.

15. A method of managing connections, comprising:

providing a plurality of physical interfaces (phys) including one or more first phys having a first link rate and one or more second phys having a second link rate;

receiving at least one connection request including a selected link rate from an initiator;

determining an arbitration in progress delay to be a dynamic time interval based at least in part on a number of requests and a requested link rate;

initiating the arbitration in progress delay when all phys having the selected link rate or higher are not available;

returning a message to the initiator indicating that a particular connection request of the at least one connection request is being held for the arbitration in progress delay period;

determining whether at least one phy having the selected link rate or higher is available before the arbitration in progress delay ends;

pairing the particular connection request of the at least one connection request with a particular phy of the at least one phy, the particular phy having a link rate not less than the selected link rate and not greater than a link rate of another available phy;

completing the particular connection request of the at least one connection request when the at least one phy having the selected link rate or higher is available before the arbitration in progress delay ends; and returning a message to the initiator indicating that the particular connection request of the at least one connection request was successfully completed.

16. The method of claim 15, wherein the method further includes: sending an arbitration in progress message to the initiator when all phys having the selected link rate or higher are not available.

17. The method of claim 15, wherein the method further includes: sending a rejection message to the initiator when all phys having the selected link rate or higher are not available after the arbitration in progress delay ends.

18. The method of claim 15, wherein the arbitration in progress delay is based on connection activity.

19. The method of claim 18, wherein the arbitration in progress delay is based on past connection requests.

20. The method of claim 18, wherein the arbitration in progress delay is based on pending connection requests.

* * * * *